United States Patent
Cho et al.

(10) Patent No.: US 9,811,883 B2
(45) Date of Patent: Nov. 7, 2017

(54) IMAGE PROCESSING METHOD AND APPARATUS

(71) Applicant: Samsung Electronics Co., Ltd., Suwon-si, Gyeonggi-do (KR)

(72) Inventors: Yang Ho Cho, Seongnam-si (KR); Dong Kyung Nam, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/939,009

(22) Filed: Nov. 12, 2015

(65) Prior Publication Data

US 2016/0148349 A1 May 26, 2016

(30) Foreign Application Priority Data

Nov. 25, 2014 (KR) .................. 10-2014-0165505

(51) Int. Cl.
*G06K 9/46* (2006.01)
*G06T 5/00* (2006.01)
(Continued)

(52) U.S. Cl.
CPC ............. *G06T 5/001* (2013.01); *G06K 9/46* (2013.01); *G06T 5/005* (2013.01); *G06T 7/11* (2017.01); *G06T 7/13* (2017.01)

(58) Field of Classification Search
CPC ..... G06T 5/001; G06T 7/0081; G06T 7/0085; G06T 7/001; G06T 5/005; G06T 7/11; G06T 7/13; G06K 9/46; G06K 9/6407; G06K 9/2009; G06K 9/6423; G06F 17/30249
See application file for complete search history.

(56) References Cited

U.S. PATENT DOCUMENTS 5,214,712 A * 5/1993 Yamamoto ............ G06T 7/0004
348/126
5,684,890 A * 11/1997 Miyashita ............... G06T 7/0004
382/154
(Continued)

FOREIGN PATENT DOCUMENTS

EP 2533212 A1 12/2012
JP 2013-168048 A 8/2013
(Continued)

OTHER PUBLICATIONS

Partial European Search Report for Corresponding European Application No. 15196336.0 dated Apr. 5, 2016.
(Continued)

*Primary Examiner* — Amir Alavi
(74) *Attorney, Agent, or Firm* — Harness, Dickey & Pierce, P.L.C.

(57) ABSTRACT

An image processing method includes acquiring a feature defining a distribution of similar forms in a first image; and restoring a hole included in a second image based on the feature. The feature may include structure information on a background included in the first image. The restoring may include determining, based on the feature, candidate blocks corresponding to a restoration block and restoring the restoration block based on the candidate blocks. The restoration block may include at least a portion of the hole.

37 Claims, 14 Drawing Sheets

(51) Int. Cl.
*G06T 7/11* (2017.01)
*G06T 7/13* (2017.01)

(56) References Cited

U.S. PATENT DOCUMENTS

| | | | | |
|---|---|---|---|---|
| 8,077,979 | B2* | 12/2011 | Kawahara | G06K 9/38 382/190 |
| 8,306,310 | B2* | 11/2012 | Tamamushi | G01N 21/95607 356/237.4 |
| 8,452,122 | B2* | 5/2013 | Hitomi | G06T 3/4015 345/20 |
| 9,135,679 | B2* | 9/2015 | Choi | G06T 5/009 |
| 9,299,011 | B2* | 3/2016 | Luo | G06K 9/66 |
| 2012/0212480 | A1* | 8/2012 | Cho | G06T 15/205 345/419 |
| 2013/0106848 | A1 | 5/2013 | Nguyen et al. | |
| 2013/0135298 | A1 | 5/2013 | Isogai et al. | |
| 2016/0148349 | A1* | 5/2016 | Cho | G06T 5/005 382/275 |

FOREIGN PATENT DOCUMENTS

| | | |
|---|---|---|
| KR | 10-1075716 B1 | 10/2011 |
| KR | 2012-0014876 A | 2/2012 |
| KR | 2012-0020078 A | 3/2012 |
| KR | 20120049636 A | 5/2012 |
| KR | 10-1210625 B1 | 12/2012 |

OTHER PUBLICATIONS

Jia-Bin Huang et al : "Image completion using planar structure guidance," ACM Transactions on graphics (TOG), vol. 33, No. 4, Jul. 27, 2014.

Deepan Gupta et al: "A non-local MRF model for heritage architectural image completion," Dec. 16, 2012.

Extended European Search Report for Corresponding European Application No. 15196336.0 dated Oct. 4, 2016.

Hervieux A et al: "Stereoscopic image inpainting using scene geometry", Multimedia and Expo (ICME), 2011 IEEE International Conference On, IEEE, Jul. 11, 2011 (Jul. 11, 2011 ), pp. 1-6, XP031964581.

Yang-Ho Cho et al: "Multi-view Synthesis Based on Single View Reference Layer", Nov. 5, 2012 (Nov. 5, 2012), Computer Vision ACCV 2012, Springer Berlin Heidelberg, Berlin, Heidelberg, pp. 565-575, XP047027212.

Meisinger Katrin et al: "Automatic TV logo removal using statistical based logo detection and frequency selective inpainting", 2005 13th European Signal Processing Conference, IEEE, Sep. 4, 2005 (Sep. 4, 2005), pp. 1-4, XP032759318.

\* cited by examiner

FIG. 2C
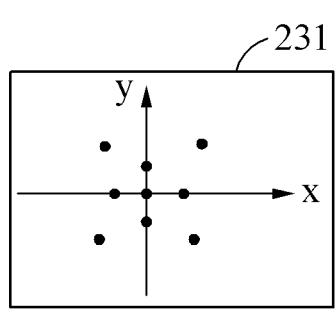
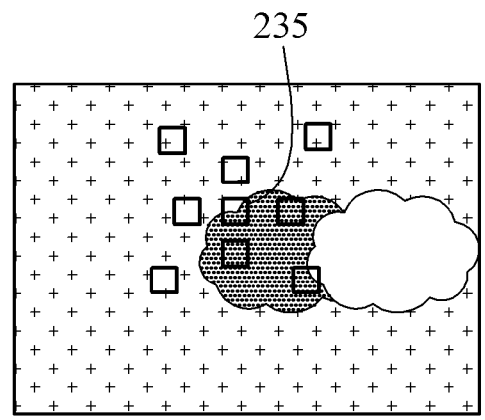

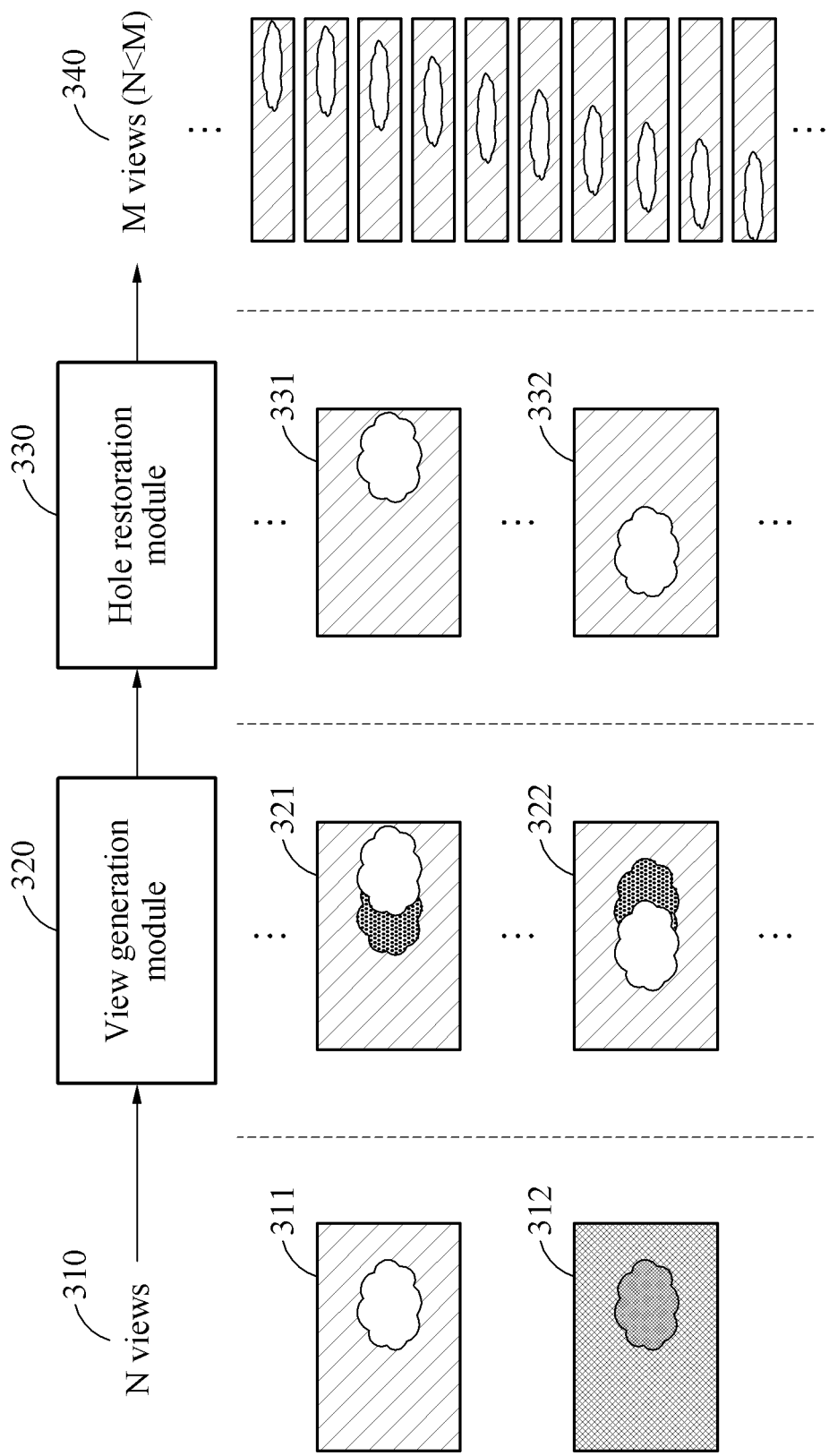

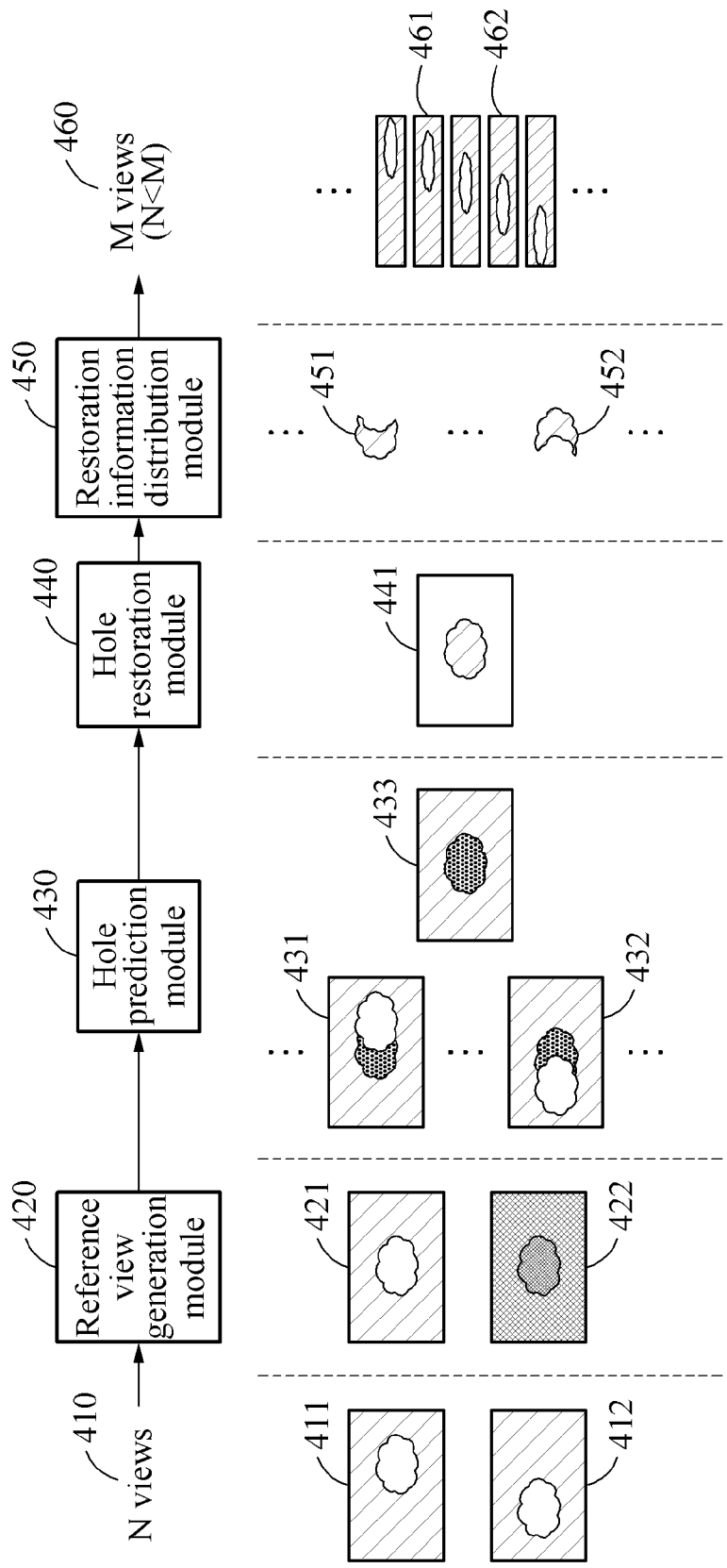

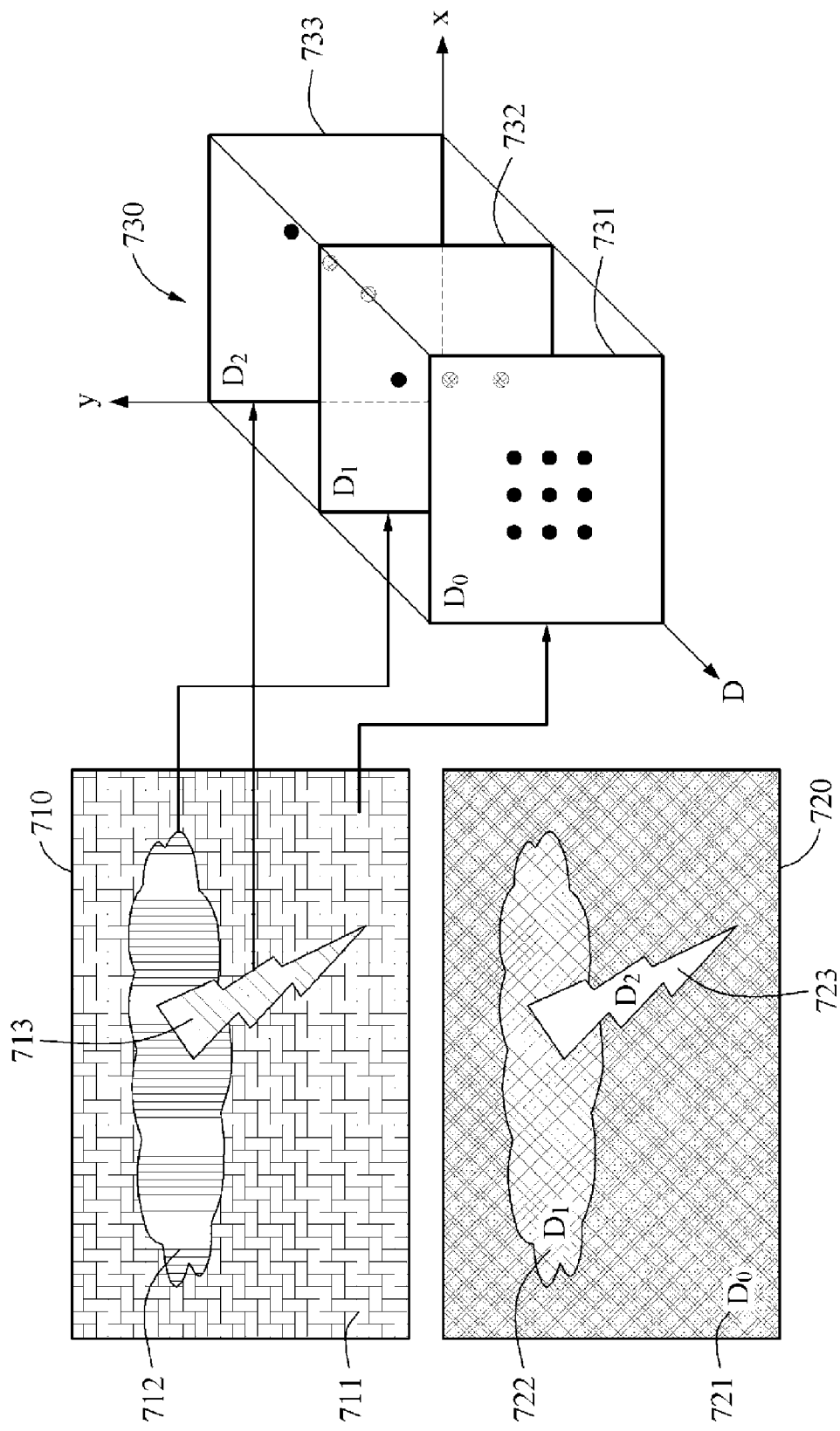

IMAGE PROCESSING METHOD AND APPARATUS

CROSS-REFERENCE TO RELATED APPLICATION

This application claims the priority benefit of Korean Patent Application No. 10-2014-0165505, filed on Nov. 25, 2014, in the Korean Intellectual Property Office, the entire contents of which are incorporated herein by reference in its entirety.

BACKGROUND

1. Field

At least some example embodiments relate to an image processing method and apparatus, and more particularly, to technology for restoring a hole in an image.

2. Description of the Related Art

In response to a generation of a restricted number of input views, an image processing apparatus may receive the input views and generate multiview images based on the received input views. A region, for example, an occlusion region, obscured by a foreground object in the input view may be represented as a hole in the multiview image.

SUMMARY

According to at least some example embodiments, an image processing method includes acquiring a feature defining a distribution of similar forms in a first image; and restoring a hole included in a second image based on the feature.

The feature may include structure information on a background included in the first image.

The restoring may include determining, based on the feature, candidate blocks corresponding to a restoration block, the restoration block including at least a portion of the hole; and restoring the restoration block based on the candidate blocks.

The restoration block may be located at a boundary of the hole, and the restoring of the restoration block may include selecting at least one first candidate block from among the candidate blocks based on image information included in a portion of the restoration block; and restoring a hole included in a remaining portion of the restoration block based on the at least one first candidate block.

The acquiring may include dividing the first image into a plurality of blocks; comparing a first block to other blocks in the plurality of blocks and detecting a second block having a similar form to the first block from among the other blocks; accumulating a frequency value of a relative position between the first block and the second block; and generating the feature based on the accumulated frequency value.

The acquiring may include dividing the first image into a plurality of blocks; detecting a structure direction of a background included in the first image; comparing a first block to other blocks positioned in the structure direction relative to the first block in the plurality of blocks, and detecting a second block having a similar form to the first block from among the other blocks; accumulating a frequency value of a relative position between the first block and the second block; and generating the feature based on the accumulated frequency value.

The detecting of the structure direction may include detecting edges included in the first image; determining a main direction based on gradients of the detected edges; and determining the main direction to be the structure direction.

The acquiring may include dividing the first image into a plurality of layers based on depth information of the first image; and detecting, for each of the plurality of layers, a layer feature defining a distribution of similar forms in the layer.

The restoring of the hole may include verifying a layer including a region adjacent to the hole; determining, based on a layer feature of the verified layer, at least one candidate block corresponding to a restoration block including at least a portion of the hole; and restoring the restoration block based on the at least one candidate block.

The acquiring may include determining a region corresponding to a position of the hole; and detecting a region feature defining a distribution of similar forms in the determined region.

The restoring may include determining at least one candidate block corresponding to a restoration block based on the region feature of the region corresponding to the position of the hole, the restoration block including at least a portion of the hole; and restoring the restoration block based on the at least one candidate block.

The method may further include generating a reference viewpoint image generated based on an input image, and wherein the restoring may include predicting holes in multiview images to be generated based on the reference viewpoint image; and restoring the predicted holes based on the feature.

The method may further include distributing restoration information on the holes into the multiview images.

The method may further include determining whether a scene transition is performed in the first image, wherein the acquiring includes detecting the feature defining a distribution of similar forms in the first image, in response to a determination that the scene transition is performed.

The acquiring may include verifying the feature defining a distribution of similar forms in the first image, based on a feature detected from a previous frame in response to a determination that the scene transition is not performed.

The acquiring may include receiving a feature generated based on a reference image, and wherein the second image may be generated by converting the reference image.

The second image may be generated by projecting pixels of the reference image onto a position corresponding to a viewpoint of the second image based on depth information of the reference image such that, a moving distance for each of the pixels in the second image increases according to a decrease in a depth value of a corresponding pixel, and the moving distance decreases according to an increase in the depth value of the corresponding pixel.

The second image may be generated by removing at least one object included in the reference image.

The first image may be identical to the second image.

The first image may be different from the second image.

According to at least some example embodiments, a non-transitory computer-readable medium comprising program code that, when executed by a processor, performs operations including acquiring a feature defining a distribution of similar forms in a first image; and restoring a hole included in a second image based on the feature.

According to at least some example embodiments, an image processing method includes dividing a first image into a plurality of blocks; analyzing the plurality of blocks; determining a portion of the blocks as a plurality of candidate blocks based on the analysis; and restoring a hole included in a second image based on the plurality of candidate blocks.

The first image may be identical to the second image.

The first image may be different from the second image.

The analyzing may include analyzing the plurality of blocks and acquiring a feature defining a distribution of similar forms in the first image; and determining the portion of the blocks as the plurality of candidate blocks based on the feature.

The restoring may include selecting at least one first candidate block from among the plurality of candidate blocks based on image information included in a portion of a restoration block disposed at a boundary of the hole; and restoring a hole included in a remaining portion of the restoration block based on the at least one first candidate block.

The dividing may include dividing the first image into a plurality of layers based on depth information of the first image; and dividing each of the layers into a plurality of blocks.

The analyzing may include analyzing blocks corresponding to each of the plurality of layers and detecting, for each of the layers, a layer feature defining a distribution of similar forms of the layer; verifying a layer including an area adjacent to the hole; and selecting the plurality of candidate blocks from the plurality of blocks included in each of the layers based on the verified layer feature.

The dividing may include determining an area corresponding to a location of the hole; and dividing the determined area into a plurality of blocks.

The analyzing may include analyzing blocks included in the determined area and detecting an area feature defining a distribution of similar forms; and selecting the plurality of candidate blocks from the blocks included in the determined area based on the area feature.

According to at least some example embodiments, a method includes receiving at least one image including a background and at least one foreground object, the at least one foreground object having a first position relative to the background; detecting a pattern of visually similar regions in the at least one image; generating a similar form distribution feature based on the detected pattern, the similar form distribution feature defining an array of areas of the at least one image; generating at least one image view based on the at least one image such that, the at least one foreground object in the at least one image view has a second position relative to the background that is different than the first position, and the at least one image view includes an image hole; selecting a first area of the at least one image view based on the similar form distribution feature; generating an output image by filling the image hole of the at least one image view based on the first area of the at least one image view.

The generating the at least one image view may include generating the at least one image view such that the image hole corresponds to a difference between the first and second positions.

The selecting may include detecting an area of the at least one view that includes both a portion of the image hole and a portion of the background; determining a plurality of candidate areas, the plurality of candidate areas being areas of the at least one view that correspond to the array of areas of the similar form distribution feature; and selecting one of the plurality of candidate areas as the first area.

The selecting one of the plurality of candidate areas may include performing a comparison based on visual features of the portion of the background and visual features of a plurality of candidate areas of the at least one view; and selecting one of the plurality of candidate areas as the first area based on the comparison.

The selected candidate area may be the area, from among the plurality of candidate area, having a highest degree of similarity with respect to the portion of the background.

The filling the image hole of the at least one image view may include replacing the image hole with visual features of the first area.

The method may further include dividing the at least one image view into a plurality of blocks, wherein the first area is a block from among the plurality of blocks, and the array of areas correspond, respectively, to an array of blocks from among the plurality of blocks.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 2A through 2C illustrate examples of a hole restoration scheme according to at least some example embodiments;

FIGS. 3 and 4 illustrate examples of applying a hole restoration scheme according to at least some example embodiments;

FIG. 7 illustrates a similar form distribution feature for each layer according to at least some example embodiments;

DETAILED DESCRIPTION

Figure 1:
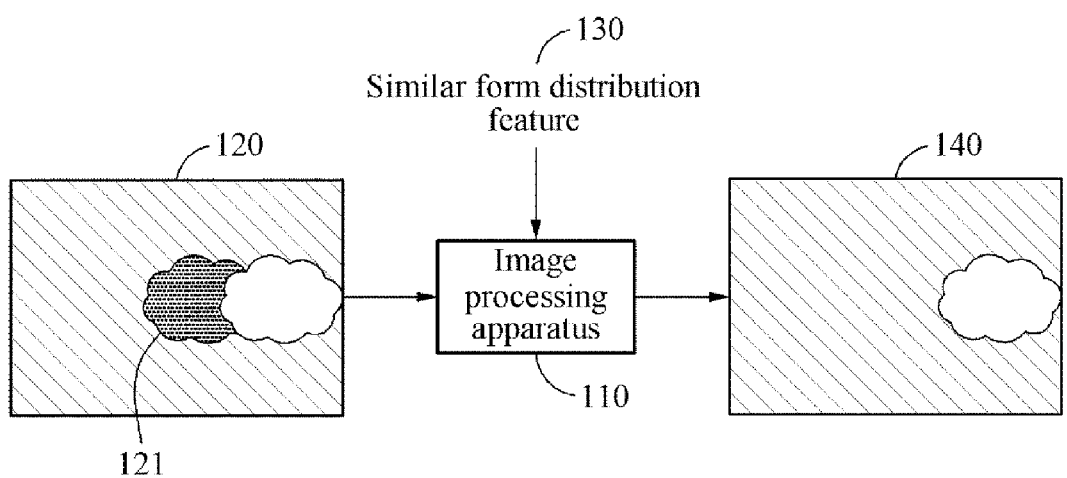
FIG. 1 illustrates an operation of an image processing apparatus according to at least some example embodiments.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

At least some of the following example embodiments may be used to restore a hole for three-dimensional (3D) view synthesis. Some example embodiments may be applied to generate a desired or, alternatively, predetermined view based on a limited number of input views. For example, some example embodiments may be applied to generate multiview images for an autostereoscopic 3D display. Also, some example embodiments may be applied to generate virtual viewpoint images for a free viewpoint display that may be viewed by a user moving freely.

FIG. 1 illustrates an operation of an image processing apparatus (e.g., the image processing apparatus 110) 110 according to at least some example embodiments. Referring to FIG. 1, the image processing apparatus 110 may restore a hole 121 included in an image 120. According to at least one example embodiment of the inventive concepts, the image processing apparatus 110 may include or be implemented by one or more circuits or circuitry (e.g., hardware) specifically structured to carry out some or all of the operations described herein as being performed by the image processing apparatus 110 (or an element thereof). According to at least one example embodiment of the inventive concepts, the image processing apparatus 110 may include or be implemented by a memory and one or more processors executing computer-readable code (e.g., software) that is stored in the memory and includes instructions corresponding to some or all of the operations described herein as being performed by the image processing apparatus 110 (or an element thereof). According to at least one example embodiment of the inventive concepts, the image processing apparatus 110 may be implemented by, for example, a combination of the above-referenced hardware and processors executing computer-readable code. For example, the image processing apparatus 110 may be implemented as a hardware module, a software module, and a combination of the hardware module and the software module. The image processing apparatus 110 may be an apparatus for processing an image and may include a computing device, for example, a server, a personal computer (PC), a laptop computer, a tablet computer, a smartphone and a wearable device.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The image processing apparatus 110 may restore the hole 121 included in the image 120 based on a similar form distribution feature 130 indicating a feature that similar forms are distributed in an image. The similar form distribution feature 130 may include structure information on a background included in the image 120. The structure information of the background is information associated with a structural form (e.g., visual features) included in the background. Here, the structural form may indicate a form provided in a structure for applying a portion to predict another portion. For example, the structural form may include a form having a repetitive pattern (e.g., a grid, vertical lines, horizontal lines, etc.).

The similar form distribution feature 130 may be, for example, a pattern of similar forms that appear repetitively on the image 120. Based on the similar form distribution feature 130, the image processing apparatus 110 may restore the hole 121 while maintaining the structure information on the background. Through this, a viewer may experience a visual naturalness between a neighboring background and a portion corresponding to the hole 121 restored in an output image 140. The hole restoration may also be referred to as, for example, a hole rendering.

As described below, the image processing apparatus 110 may be applied to technology for generating a multiview image from an input image for a glasses-free 3D display. For example, when a plurality of desired or, alternatively, pre-determined viewpoint images is generated based on a restricted number of input images, a background region obscured by a foreground may appear on a new viewpoint image as a hole. The image processing apparatus 110 may be used to restore the hole generated in a process of generating a multiview image. Various example structures and operations of the image processing apparatuses will be discussed in greater detail below with reference to FIGS. 2A-12. According of at least some example embodiments, the structures and operations of the image processing apparatuses discussed below with reference to FIGS. 2A-12 may are example structures and operations of the image processing apparatus 110.

Figure 2A:
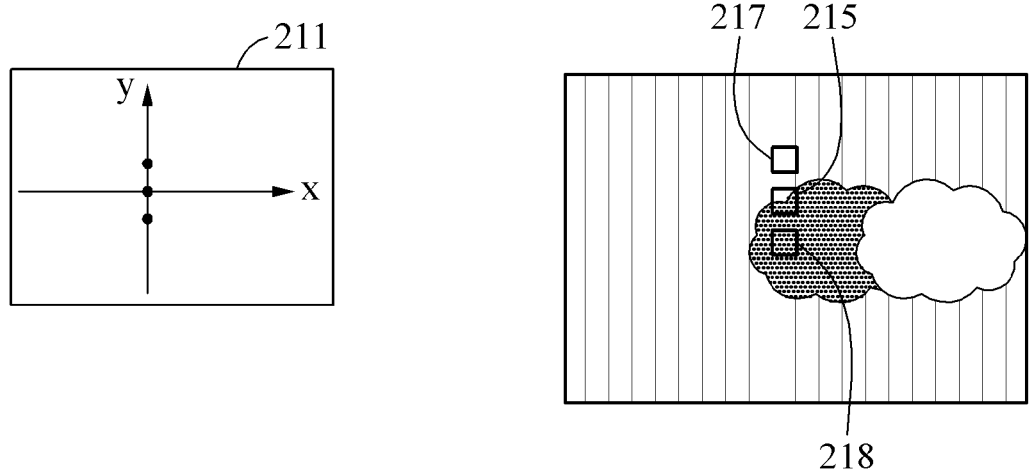
Figure 2B:
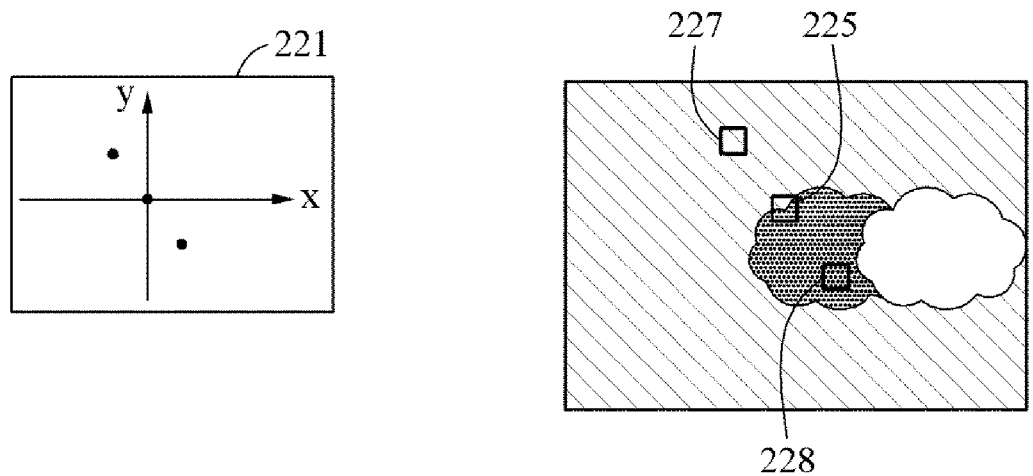

FIGS. 2A through 2C illustrate examples of a hole restoration scheme according to at least some example embodiments. Referring to FIGS. 2A through 2C, a region explored to restore a hole may vary based on a similar form distribution feature. The similar form distribution feature may include a plurality of points. Each of the plurality of points included in the similar form distribution feature may provide relative position information on a region corresponding to a relatively high possibility of having a similar form when compared to a desired or, alternatively, predetermined region in an image. An image processing apparatus (e.g., the image processing apparatus 110) may explore candidate regions indicated by the similar form distribution feature, for example, a similar form distribution feature 211, to restore the hole in lieu of fully scanning an image. Consequently, an operational complexity of the hole restoration process may be reduced, and thus, at least some example embodiments may providing the technical advantage of reducing an amount of time and/or processing resources required by, for example, the image processing apparatus 110 to perform the above-referenced image processing.

The image processing apparatus may explore a candidate block corresponding to another region to restore a restoration block which is a region to be restored. The image processing apparatus may determine candidate blocks available for restoring the restoration block. The image processing apparatus may restore the restoration block based on the determined candidate blocks.

The restoration block may be located at a boundary of the hole. For example, a portion of the restoration block may include image information, and a remaining portion of the restoration block may include the hole. The image processing apparatus may determine a desirable or, alternatively, desired or, alternatively, optimal candidate block to be used to restore the restoration block by comparing the image information included in the portion of the restoration block to image information included in the candidate blocks. The image processing apparatus may restore the hole included in the restoration block based on image information included in the determined desirable or, alternatively, desired or, alternatively, optimal candidate block.

As an example, in FIG. 2A, the similar form distribution feature 211 may include points disposed in a y-axial direction based on an origin. In a case of restoring a hole included in a restoration block 215, the image processing apparatus may explore a first candidate block 217 disposed above the restoration block 215 and a second candidate block 218 disposed below the restoration block 215 based on the similar form distribution feature 211. The image processing apparatus may compare image information included in a portion of the restoration block 215 to image information included in candidate blocks. Since the image information included in the portion of the restoration block 215 matches information included in the first candidate block 217, the image processing apparatus may select the first candidate block 217 as an desired or, alternatively, optimal candidate block. The image processing apparatus may restore the hole included in a remaining portion of the restoration block 215 based on the first candidate block 217.

As another example, in FIG. 2B, a similar form distribution feature 221 may include points disposed in a diagonal direction based on an origin. In this example, the image processing apparatus may explore candidate blocks 227 and 228 disposed in the diagonal direction relative to a restoration block 225 based on the similar form distribution feature 221. The image processing apparatus may select the candidate block 227 as desired or, alternatively, optimal candidate block, and restore a hole included in the restoration block 225.

As still another example, in FIG. 2C, a similar form distribution feature 231 may include points disposed in various directions based on an origin. In this example, the image processing apparatus may explore candidate blocks disposed in various directions relative to a restoration block 235 based on the similar form distribution feature 231. The image processing apparatus may select a desired or, alternatively, optimal candidate block, and restore a hole included in the restoration block 235 based on the selected desired or, alternatively, optimal candidate block. When a plurality of desired or, alternatively, optimal candidate blocks is selected, the image processing apparatus may restore the hole included in the restoration block 235 through a combination of image information included in the selected desired or, alternatively, optimal candidate blocks.

In an example, in lieu of fully scanning an image, only candidate blocks indicated by a similar form distribution feature may be explored to discover an desired or, alternatively, optimal candidate block, thereby reducing a number of operations and providing the technical advantage of reducing an amount of time and/or processing resources required by, for example, the image processing apparatus 110 to perform the above-referenced image processing. Through this, degradation in an image quality due to an error occurring in a process of fully scanning the image may be prevented.

The image processing apparatus may restore the hole based on a global optimization scheme. For example, the image processing apparatus may perform a global optimization based on a smoothness term related to a similarity to a neighboring pixel and a data term related to a pixel value obtained from a desired or, alternatively, optimal candidate block in a process of restoring each pixel of a hole.

FIGS. 3 and 4 illustrate examples of applying a hole restoration scheme according to at least some example embodiments. In the example shown in FIG. 3, an image processing apparatus (e.g., the image processing apparatus 110) includes a view generation module 320 and a hole restoration module 330. Each of the view generation module 320 and the hole restoration module 330 may be implemented as a hardware module, a software module, and a combination of the hardware module and the software module.

The view generation module 320 may receive N views 310, N being a positive integer. Each of the N views 310 may be an image corresponding to a different viewpoint. Also, each of the N views 310 may include a color image. The view generation module 320 may acquire disparity information or depth information corresponding to the N views 310.

As an example, when N is "1", the view generation module 320 may receive the N view 310 and disparity information or depth information corresponding to the N view 310. Disparity information or depth information for each pixel may be expressed using a disparity map or a depth map. The view generation module 320 may receive a view 311 and a depth image 312. The depth image 312 may be, for example, an image including depth information corresponding to pixels of the view 311. As another example, when N is greater than "1", the view generation module 320 may generate disparity information and depth information based on the N views 310. The view generation module 320 may generate the disparity information or the depth information based on, for example, a stereo matching scheme.

The view generation module 320 may generate a new view based on the N views 310 using the disparity information or the depth information. The new view may be, for example, an image corresponding to a different viewpoint when compared to the N views 310. In this example, each of the one or more N views 310 may be a reference image for generating the new view.

The view generation module 320 may generate the new view by moving the pixels included in the N views 310 based on a depth. For example, the view generation module 320 may project the pixels of the N views 310 onto a position corresponding to the viewpoint of the new view based on the depth information of the N views 310. In this example, a moving distance for each of the pixels included in the N views 310 may increase according to a decrease in a depth value of a corresponding pixel, and the moving distance for each of the pixels may be reduced according to an increase in the depth value of the corresponding pixel.

Since the moving distance for each of the pixels included in the N views 310 differs based on the depth value, a hole may be generated in a process of generating the new view. In the N views 310, a region obscured by a foreground in a background may correspond to the hole in the new view.

For example, a view 321 may be an image corresponding to a viewpoint positioned at a left side of a viewpoint of the view 311. To generate the view 321, the view generation module 320 may move an object corresponding to the foreground in a rightward direction. In response to the moving, a portion of the region obscured by the foreground in the background of the view 311 may appear as a hole on the view 321. Also, a view 322 may be an image corresponding to a viewpoint positioned at a right side of the viewpoint of the view 311. To generate the view 322, the view generation module 320 may move the object corresponding to the foreground in a leftward direction. In response to the moving, a portion of the region obscured by the foreground in the background of the view 311 may appear as a hole on the view 322.

The hole restoration module 330 may restore the hole included in the new view based on a similar form distribution feature. A view 331 may be an image obtained by restoring the hole included in the view 321, and a view 332 may be an image obtained by restoring the hole included in the view 322. Since the descriptions provided with reference to FIG. 2 are also applicable here, repeated descriptions with respect to an operation of the hole restoration module 330 will be omitted for increased clarity and conciseness. The similar form distribution feature may be generated by analyzing the N views 310 or the new view. A scheme of generating the similar form distribution feature will be explained with reference to the following descriptions. In an example of FIG. 3, M views 340 may be generated based on the N views 310, M being an integer greater than N.

In the example shown in FIG. 4, an image processing apparatus (e.g., the image processing apparatus 110) includes a reference view generation module 420, a hole prediction module 430, a hole restoration module 440, and a restoration information distribution module 450. Each of the reference view generation module 420, the hole prediction module 430, the hole restoration module 440, and the restoration information distribution module 450 may be implemented as a hardware module, a software module, or a combination of the hardware module and the software module.

The reference view generation module 420 may receive N views 410, N being a positive integer. Each of the N views 410 may correspond to a different viewpoint. The N views 410 may be, for example, a stereo image including a left view 411 corresponding to a left-eye viewpoint image, and a right view 412 corresponding to a right-eye viewpoint image 412.

The reference generation module 420 may generate a reference view based on the N views 410. The reference view may be an image corresponding to a reference viewpoint. The reference viewpoint may be determined in advance as an intermediate viewpoint of input viewpoints or an intermediate viewpoint of viewpoints to be generated. For example, the reference view generation module 420 may generate an intermediate-viewpoint view 421 based on the stereo image.

The intermediate-viewpoint view 421 may not include a hole in practice. For example, when the intermediate-viewpoint view 421 is generated based on the left view 411 as a reference, an object corresponding to a foreground of the left view 411 may be moved in a leftward direction. In this example, a hole may be generated on a right side of the object. The generated hole may be restored based on the right view 412. Conversely, when the intermediate-viewpoint view 421 is generated based on the right view 412 as a reference, an object corresponding to a foreground of the right view 412 may be moved in a rightward direction. In this example, a hole may be generated on a left side of the object. The generated hole may be restored based on the left view 411.

The reference view generation module 420 may acquire disparity information or depth information corresponding to the reference view. For example, the reference view generation module 420 may generate the disparity information or the depth information of the stereo image through a stereo matching of the left view 411 and the right view 412. The reference view generation module 420 may generate disparity information or depth information of the intermediate-viewpoint view 421 based on the disparity information or the depth information of the stereo image using an identical scheme to a scheme of generating the intermediate-viewpoint view 421 based on the stereo image. The disparity information or the depth information may be expressed in a form of a disparity map or a depth map 422.

The hole prediction module 430 may predict holes to be generated when views corresponding to multiple viewpoints are generated based on the reference view. For example, the hole prediction module 430 may predict a hole to be generated when a view 431 corresponding to a viewpoint positioned at the left side of an intermediate viewpoint based on the intermediate-viewpoint view 421. The viewpoint of the view 431 may be a viewpoint positioned in the leftward direction relative to the left view 411. Also, the hole prediction module 430 may predict a hole to be generated when a view 432 corresponding to viewpoints positioned at the right side of the intermediate viewpoint based on the intermediate-viewpoint view 421. The viewpoint of the view 432 may be a viewpoint positioned in the rightward direction relative to the right view 412.

The hole prediction module 430 may incorporate the predicted holes in the reference view. For example, the hole prediction module 430 may generate a hole image 433 including all of the predicted holes by incorporating the predicted holes in the intermediate-viewpoint view 421.

The hole restoration module 440 may restore the predicted holes based on the similar form distribution feature. For example, the hole restoration module 440 may restore a hole included in the hole image 433. Since the descriptions provided with reference to FIG. 2 are also applicable here, repeated descriptions with respect to an operation of the hole restoration module 440 will be omitted for increased clarity and conciseness. The similar form distribution feature may be generated by analyzing the reference view or the hole image 433. A scheme of generating the similar form distribution feature will be explained with reference to the following descriptions.

The restoration information distribution module 450 may distribute restoration information on the predicted holes, to multiview images. Since each of the multiview images includes a different hole, different restoration information may be required to restore the hole included in each of the multiview images. The restoration information distribution module 450 may distribute, to a corresponding viewpoint image, restoration information required to restore the hole included in each of the multiview images. For example, the restoration information distribution module 450 may distribute restoration information 451 to the view 431 corresponding to the viewpoint positioned on the left side of the intermediate viewpoint, and distribute restoration information 452 to the view 432 corresponding to the viewpoint positioned on the right side of the intermediate viewpoint.

In an example of FIG. 4, M views 460 may be generated based on the N views 410, M being an integer greater than N. For example, a view 461 may be an image obtained by restoring the view 431, and a view 462 may be an image obtained by restoring the view 432.

As described with reference to FIGS. 3 and 4, an image including a hole may be generated by converting an image not including a hole. The converting may be performed based on various schemes including, for example, a scheme of projecting an object corresponding to a foreground to change a viewpoint. The hole may be generated based on, for example, a scheme of removing a desired or, alternatively, predetermined object from an image.

Figure 5:
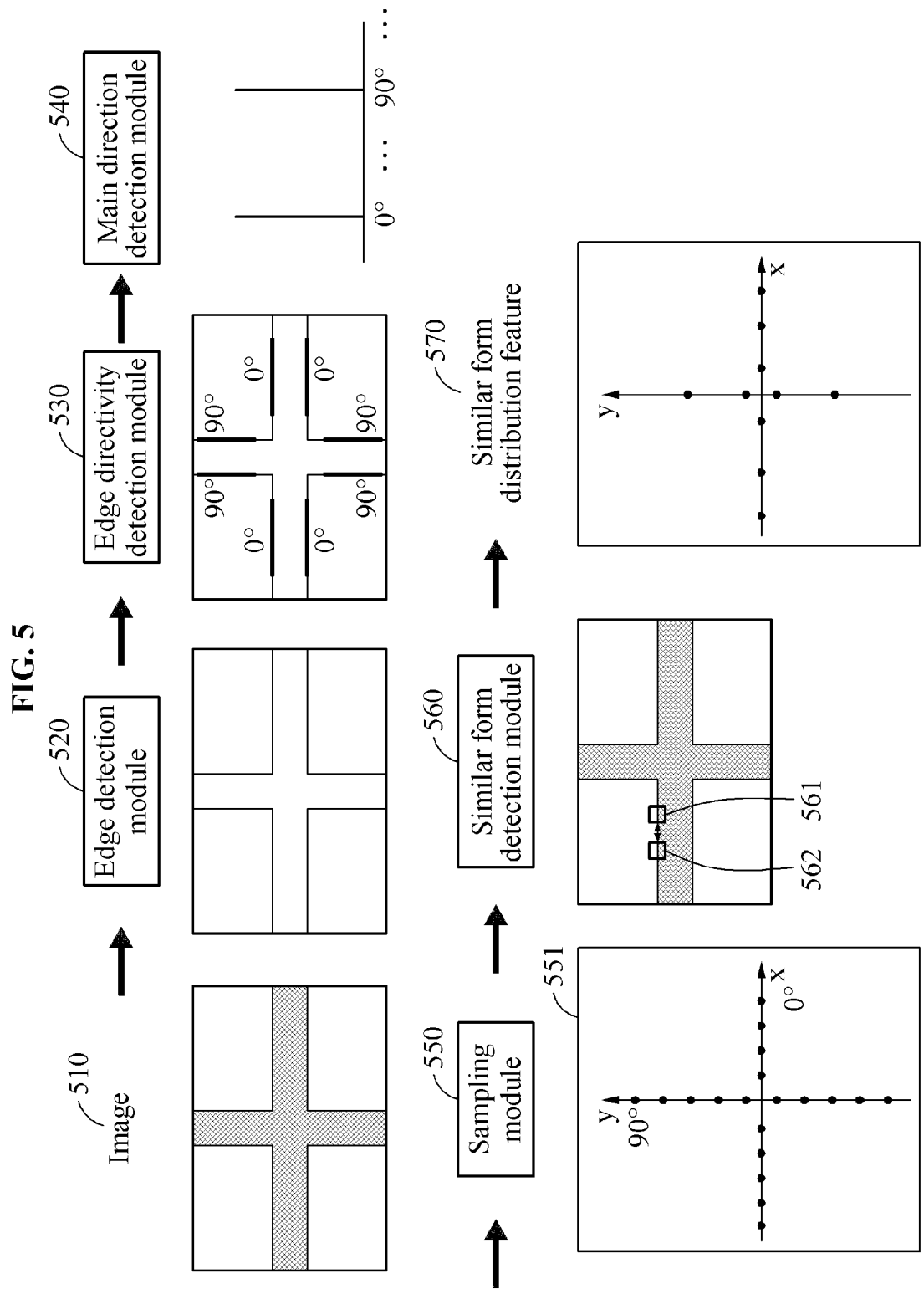
FIG. 5 illustrates a scheme of detecting a similar form distribution feature according to at least some example embodiments.

FIG. 5 illustrates a scheme of detecting a similar form distribution feature according to at least some example embodiments. Referring to FIG. 5, an image processing apparatus (e.g., the image processing apparatus 110) includes an edge detection module 520, an edge directivity detection module 530, a main direction detection module 540, a sampling module 550, and a similar form detection module 560. Each of the edge detection module 520, the edge directivity detection module 530, the main direction detection module 540, the sampling module 550, and the similar form detection module 560 may be implemented as a software module, a hardware module, and a combination of the software module and the hardware module.

The edge detection module 520 may detect an edge from an image 510. In this example, the image 510 may be an image including a hole. Also, the image 510 may be an image not including a hole. When the image 510 includes a hole, the edge detection module 520 may detect an edge from a region other than the hole. A region used to fill the hole may be a background region having a depth value greater than that of a foreground region originally occupying a portion at which the hole is generated. The edge detection module 520 may detect the edge from the background region having the depth value greater than that of the foreground region. The edge detection module 520 may use general edge detection schemes to detect the edge from the image 510.

The edge directivity detection module 530 may detect directivities of edges. For example the edge directivity detection module 530 may detect gradients of the edges. The edge directivity detection module 530 may divide the edges detected by the edge detection module 520 based on a desired or, alternatively, predetermined reference. For example, the edge directivity detection module 530 may divide the edges at a discontinuous point. Also, the edge directivity detection module 530 may divide the edges at a point at which a variation in a gradient is non-linear. The foregoing descriptions are provided as an example and thus, various schemes may be used to divide the edges. The edge directivity detection module 530 may calculate a gradient for each of the divided edges.

The main direction detection module 540 may detect a main direction of the edges by accumulating the gradients of the edges in quantized bins. As an example, the main direction detection module 540 may accumulate the gradients of the edges in the bins in which a gradient is quantized based on a desired or, alternatively, predetermined angle unit, for example, angles varying by one degree) (°) in a range between 0° and 359°.

The main direction detection module 540 may determine a main direction of the edges based on a result of the accumulating. For example, the main direction detection module 540 may determine at least one gradient, for example, 0° and 90°, corresponding to a bin of which a number of accumulations is greater than or equal to a desired or, alternatively, predetermined threshold, as the main direction of the edges. Alternatively, the main direction detection module 540 may determine a gradient, for example, 0° and 90°, corresponding to the desired or, alternatively, predetermined number of bins having the greatest number of accumulations, as the main direction of the edges. The foregoing descriptions are provided as an example and thus, various schemes may be used to determine the main direction of the edges using the main direction detection module 540 based on the result of the accumulating.

The main direction of the edges may be a structure direction on a background included in the image 510. For example, when the edge detection module 520 detects the edge from the background region of the image 510, the main direction of the edges determined by the main direction detection module 540 may indicate the structure direction on the background region included in the image 510.

The sampling module 550 may perform a sampling based on the main direction of the edges. For example, the sampling module 550 may device the image 510 into a plurality of blocks, and sample a first block and other blocks disposed in the main direction relative to the first block among the plurality of blocks. Through the sampling, the sampling module 550 may acquire image information included in a corresponding block.

The sampling module 550 may determine a block disposed upward the edges detected by the edge detection module 520 as a first block 561. The sampling module 550 may sample blocks spaced apart at a desired or, alternatively, predetermined interval in the main direction, for example, a 0° direction and a 90° direction, relative to the first block 561.

The similar form detection module 560 may compare, based on a result of the sampling, the first block 561 to the other blocks disposed in the main direction relative to the first block 561, thereby detecting a second block 562 having a form similar to the first block 561. The similar form detection module 560 may accumulate a frequency value of a relative position between the first block 561 and the second block 562. For example, when the second block 562 is spaced apart from the first block 561 at an interval of −a (where −a represents a number of distance units) on an x axis based on the first block 561, the similar form detection module 560 may increase the frequency value of a point spaced apart at an interval of −a based on an origin in a graph 551 for generating a similar form distribution feature. A moving distance from the first block 561 to the second block 562 may also be referred to as, for example, a movement value For example, referring to FIG. 5, the similar form detection module 560 may acquire the similar form distribution feature 570 of the image 510 based on the graph 551. Each of points included in the graph 551 may indicate a relative position of similar blocks in the image 510. The similar form detection module 560 increasing a frequency value of a point in the graph 551 may be understood as the similar form detection module 560 increasing a frequency value of a relative position indicated by the corresponding point. For example, the similar form detection module 560 may detect a second block 562 similar to a first block 561 in the image 510. In the example shown in FIG. 5, it is assumed that the similar form detection module 560 detects the second block 562 similar to the first block 561 at a location spaced apart from the first block 561 by −a in an x-axial direction. In this example, a frequency value of a point corresponding to coordinates (−a, 0) of the graph 551 may increase.

The similar form detection module 560 may generate a similar form distribution feature 570 based on a result obtained by accumulating a frequency value of a relative position between blocks in similar forms. For example, the similar form detection module 560 may generate the similar form distribution feature 570 based on relative positions corresponding to a cumulative frequency value greater than or equal to a desired or, alternatively, predetermined threshold. Alternatively, the similar form detection module 560 may generate the similar form distribution feature 570 based on the desired or, alternatively, predetermined number of relative positions corresponding to the greatest cumulative frequency value. The above descriptions are provided as an example and thus, various schemes may be used to generate the similar form distribution feature 570 using the similar form detection module 560 based on the result of accumulating the frequency value of the relative position between the blocks of the similar forms.

The image processing apparatus may recognize a structure direction of a background and detect a similar form distribution feature in the recognized structure direction such that a structure of the background is maintained in a process of restoring a hole. Also, by detecting the similar form distribution feature in the structure direction of the background, the image processing apparatus may reduce the number of operations, and reduce the chances of an error occurring in which the similar form distribution feature is inaccurately verified in a case of fully scanning an image.

The similar form distribution feature may appear for each of an edge region, a uniform region, and a texture region. Although examples of generating the similar form distribution feature 570 based on the edge included in the image 510 are described with reference to FIG. 5, various examples are also applicable thereto. FIG. 5 illustrates an operation of generating a similar form distribution feature 570. According to at least some example embodiments, the operation of generating the similar form distribution feature 570 may be performed prior to a hole filling operation. According to at least some example embodiments, an efficiency of the hole filling operation may be improved by using the similar form distribution feature 570.

While FIG. 5 is explained with reference to an example in which an edge is detected to improve an efficiency of the operation of generating the similar form distribution feature 570, according to at least some example embodiments, operations 520, 530, and 540 may be omitted in an example of FIG. 5. In such an example, sampling may be performed on more points, for example, points evenly and widely distributed in a first quadrant through a fourth quadrant of the graph 551, when compared to points represented in the graph 551 in operation 550. A similar form distribution feature for textures or uniform regions may be generated based on a same or, alternatively, similar scheme.

For example, the image processing apparatus may divide the image 510 into a plurality of blocks, and scan the plurality of blocks to detect a block having a form similar to a desired or, alternatively, predetermined block. In this example, the image processing apparatus may also generate the similar form distribution feature 570 without detecting of the edge.

Figure 6A:
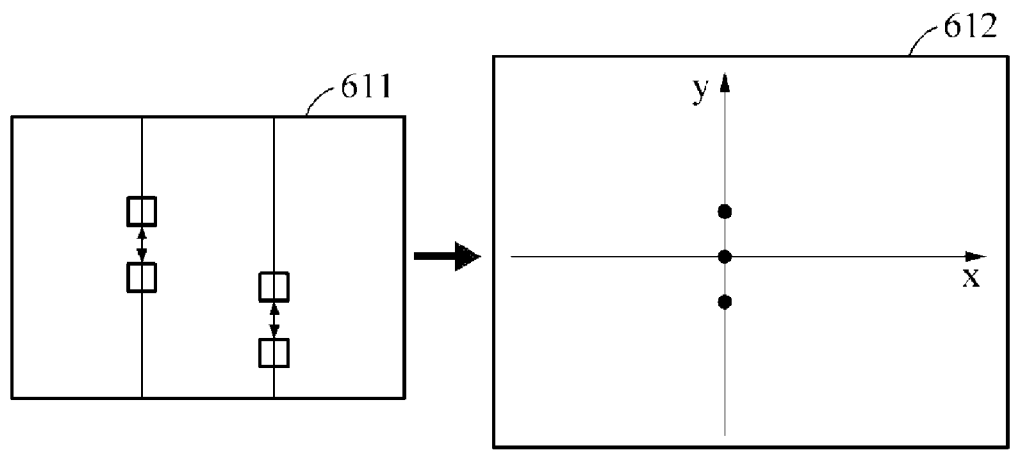
FIGS. 6A through 6C illustrate examples of a similar form distribution feature formed based on structure information on a background included in an image according to at least some example embodiments.
Figure 6B:
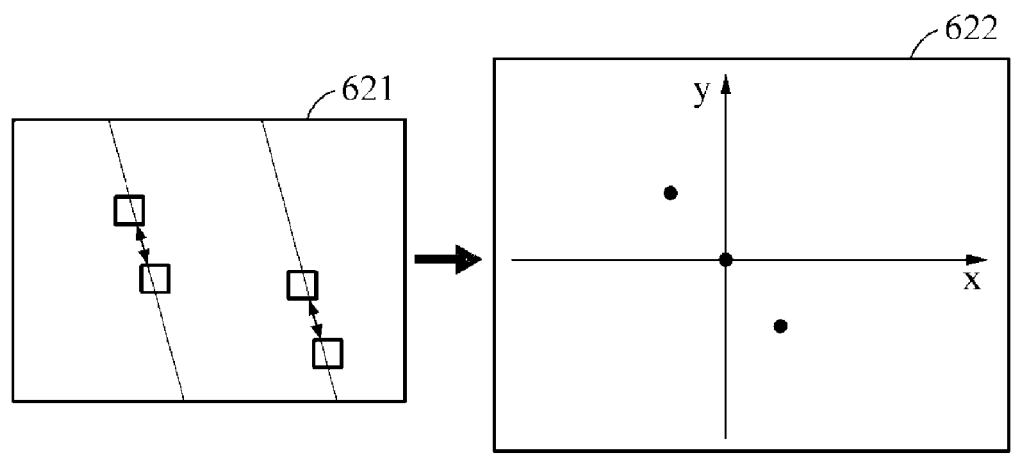
Figure 6C:
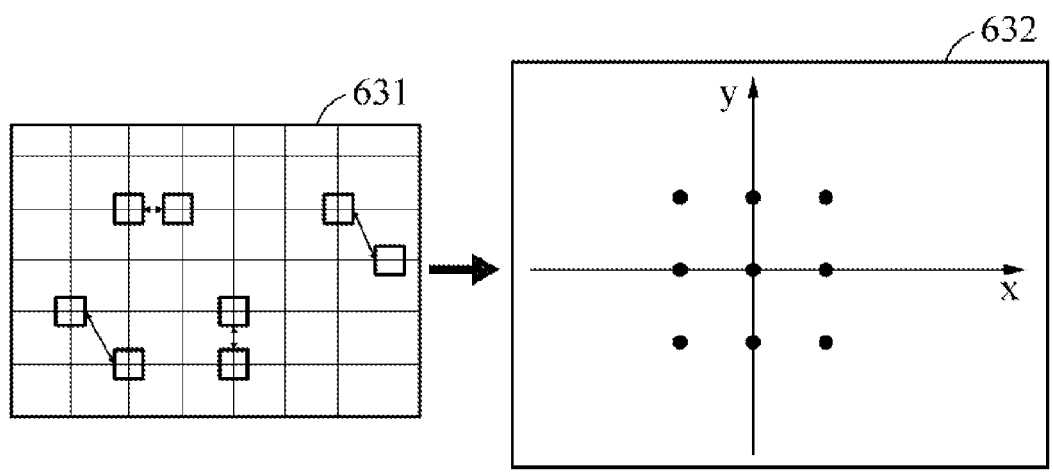

FIGS. 6A through 6C illustrate examples of a similar form distribution feature formed based on structure information on a background included in an image according to at least some example embodiments. Referring to FIG. 6A, a background of the image 611 includes vertical lines. In this example, a similar form distribution feature may be generated as shown in a graph 612. Referring to FIG. 6B, a background of an image 621 includes diagonal lines. In this example, a similar form distribution feature may be generated as shown in a graph 622. Referring to FIG. 6C, a background of an image 631 includes grid lines. In this example, the similar form distribution feature may be generated as shown in a graph 632.

FIG. 7 illustrates a similar form distribution feature for each layer according to at least some example embodiments. Referring to FIG. 7, an image processing apparatus (e.g., the image processing apparatus 110) may use a different similar form distribution feature for each disparity layer or each depth layer. Hereinafter, a layer may indicate one of a disparity layer and a depth layer, The image 710 may be classified into layers based on disparity information or depth information. Disparity information or depth information for each pixel included in the image 710 may be quantized into a desired or, alternatively, predetermined number of layers. For example, the disparity information or the depth information for each pixel included in the image 710 may be quantized into one of three layers $D_0$, $D_1$, and $D_2$.

Each pixel included in the image 710 may be classified into a layer to which disparity information or depth information of a corresponding pixel is quantized. For example, pixels included in a first region 711 of the image 710 may be classified into a layer $D_0$ 721 of a map 720 representing the disparity information or the depth information. Also, pixels included in a second region 712 of the image 710 may be classified into a layer $D_1$ 722, and pixels included in a third region 713 of the image 710 may be classified into a layer $D_2$ 723.

In the example shown in FIG. 7, the layer $D_0$ may have a maximum depth value and the layer $D_2$ may have a minimum depth value. A layer having a greater depth value may have a relatively high probability that the layer corresponds to the background. Conversely, a layer having a smaller depth value may have a relatively high probability that the layer corresponds to the foreground.

The image processing apparatus may generate the similar form distribution feature for each layer. For example, since the first region 711 includes a grid pattern, a similar form distribution feature of the first region 711 may be generated as shown in a first similar form distribution diagram 731. Additionally, since the second region 712 includes vertical lines, a similar form distribution feature of the second region may be generated as shown in a second similar form distribution diagram 732. Also, since the third region 713 includes diagonal lines, a similar form distribution feature may be generated as shown in a third similar form distribution diagram 733.

Figure 8:
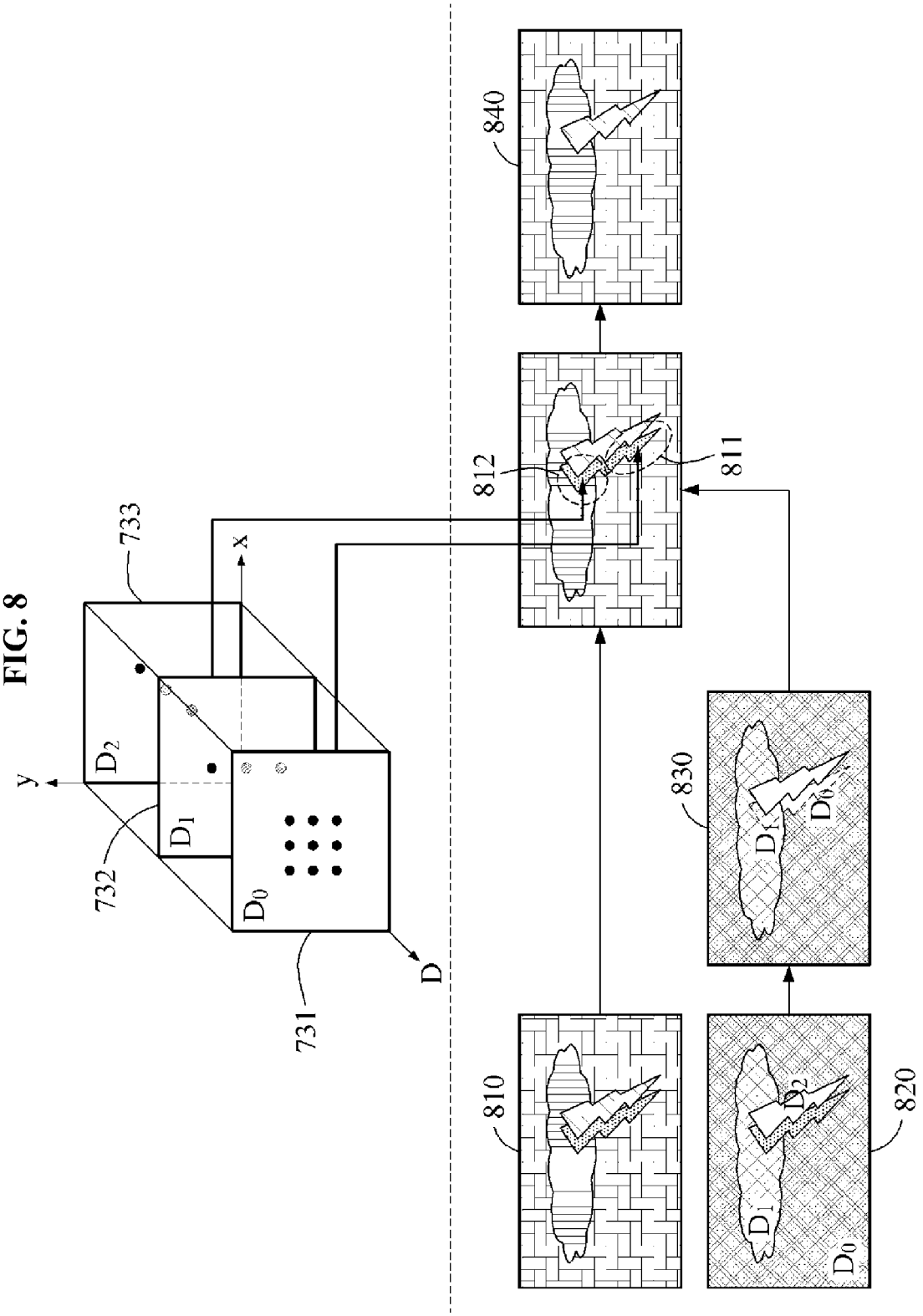
FIG. 8 illustrates a scheme of restoring a hole based on a similar form distribution feature for each layer according to at least some example embodiments.

FIG. 8 illustrates a scheme of restoring a hole based on a similar form distribution feature for each layer according to at least some example embodiments. Referring to FIG. 8, an image processing apparatus (e.g., the image processing apparatus 110) may acquire a target view 810 and a target disparity 820. The target disparity 820 may be replaced with, for example, a target depth.

The image processing apparatus may generate the target view 810 corresponding to a desiring viewpoint based on the image 710 of FIG. 7. As described above, the target view 810 may include a hole. The image processing apparatus may generate the target disparity 820 corresponding to the target view 810 based on the map 720 of FIG. 7. Similarly to the target view 810, the target disparity 820 may also include a hole.

The image processing apparatus may restore a disparity hole included in the target disparity 820. The image processing apparatus may restore the disparity hole by classifying each pixel of the disparity hole into a layer having a relatively great depth value, for example, a relatively high probability that the layer corresponds to a background, among layers neighboring the disparity hole. The image processing apparatus may determine the layer used to restore the disparity hole based on a viewpoint transition direction. For example, in a case of generating a viewpoint positioned at a left side of a reference viewpoint, an object corresponding to a foreground may move in a rightward direction, which may cause a generation of the disparity hole. Thus, the image processing apparatus may restore the disparity hole using a layer adjacent to the disparity hole in a leftward direction.

The image processing apparatus may restore the hole included in the target view 810 based on a restored target disparity 830. The image processing apparatus may verify a corresponding layer including each pixel of the hole based on the restored target disparity 830. For example, a first hole region 811 may be included in a layer $D_0$ in the restored target disparity 830. In this example, the image processing apparatus may restore the first hole region 811 based on the first similar form distribution diagram 731 of the layer $D_0$. Also, a second hole region 812 may be included in a layer $D_1$ in the restored target disparity 830. In this example, the image processing apparatus may restore the second hole region 812 based on the second similar form distribution diagram 732 of the layer $D_1$. The image processing apparatus may generate a target view 840 obtained by restoring the hole. Since the descriptions provided with reference to FIG. 2 are also applicable here, repeated descriptions with respect to a scheme of restoring the first hole region 811 or the second hole region 812 based on the first similar form distribution diagram 731 or the second similar form distribution diagram 732 will be omitted for increased clarity and conciseness.

Figure 9:
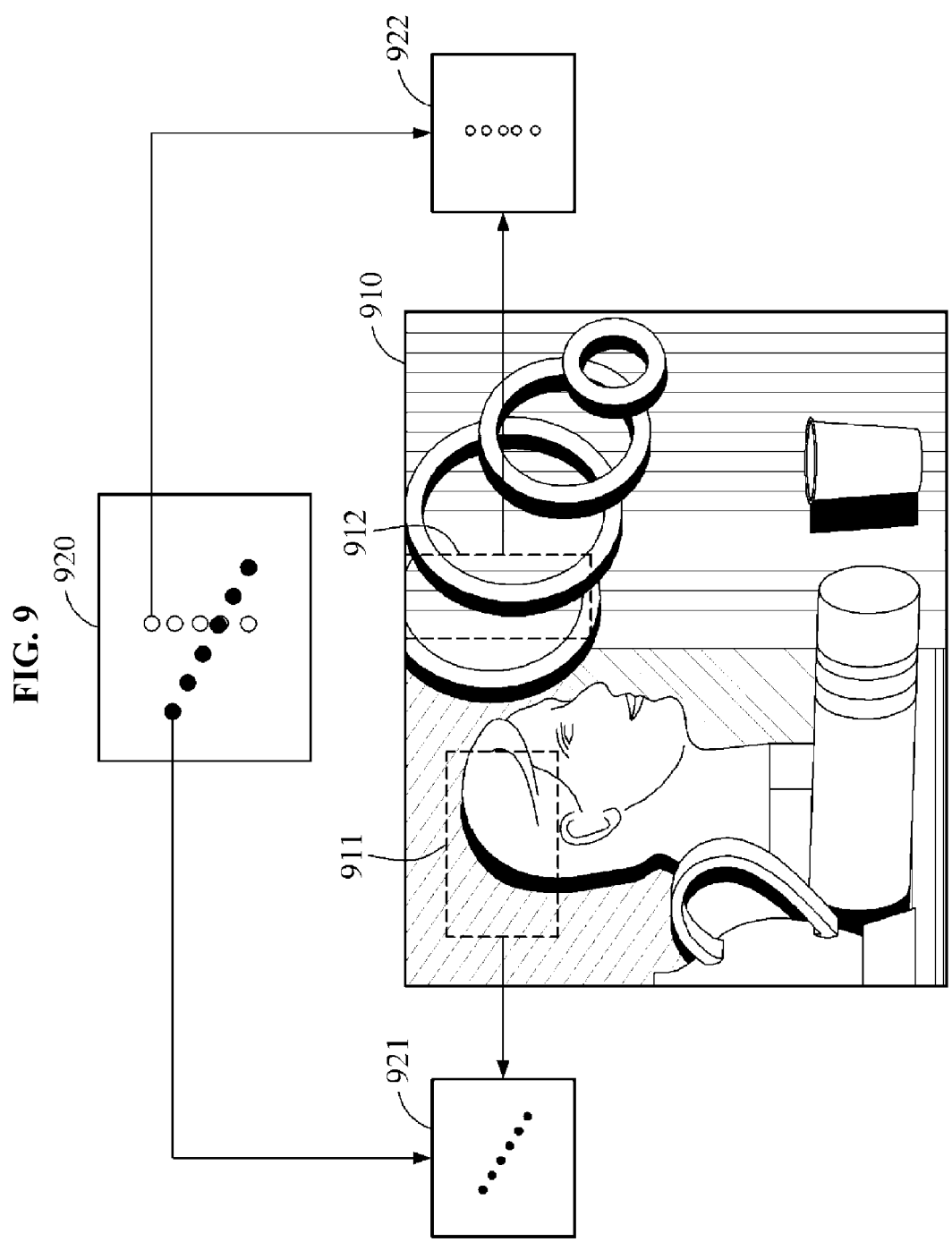
FIG. 9 illustrates a scheme of restoring a hole based on a similar form distribution feature for each region according to at least some example embodiments.

FIG. 9 illustrates a scheme of restoring a hole based on a similar form distribution feature for each region according to at least some example embodiments. Referring to FIG. 9, an image processing apparatus (e.g., the image processing apparatus 110) may restore a hole based on a similar form distribution feature of a region adjacent to the hole.

As an example, a similar form distribution feature generated based on an entire background of an image 910 may be expressed as shown in a similar form distribution diagram 920. A background in a first region 911 includes only diagonal lines, and a background in a second region 912 includes only vertical lines. In this example, to improve a quality of a restored image, the image processing apparatus may restore a hole included in the first region 911 using a similar form distribution diagram 921 in lieu of a similar form distribution diagram 920. Similarly, the image processing apparatus may restore a hole included in the second region 912 using a similar form distribution diagram 922 in lieu of the similar form distribution diagram 920.

The image processing apparatus may determine a region corresponding to a position of a hole, and acquire a similar form distribution feature corresponding to the determined region. The image processing apparatus may detect the similar form distribution feature corresponding to the determined region, or receive a pre-detected similar form distribution feature corresponding to the determined region.

Although not shown in the drawings, the image processing apparatus may use a similar form distribution feature to which both layer and region are applied. For example, each background corresponding to an equal layer may include different structure information for each region. The image processing apparatus may verify a layer corresponding to a hole as described with reference to FIG. 8. The image processing apparatus may apply the similar form distribution feature of the determined region corresponding to the hole as described with reference to FIG. 9.

Figure 10:
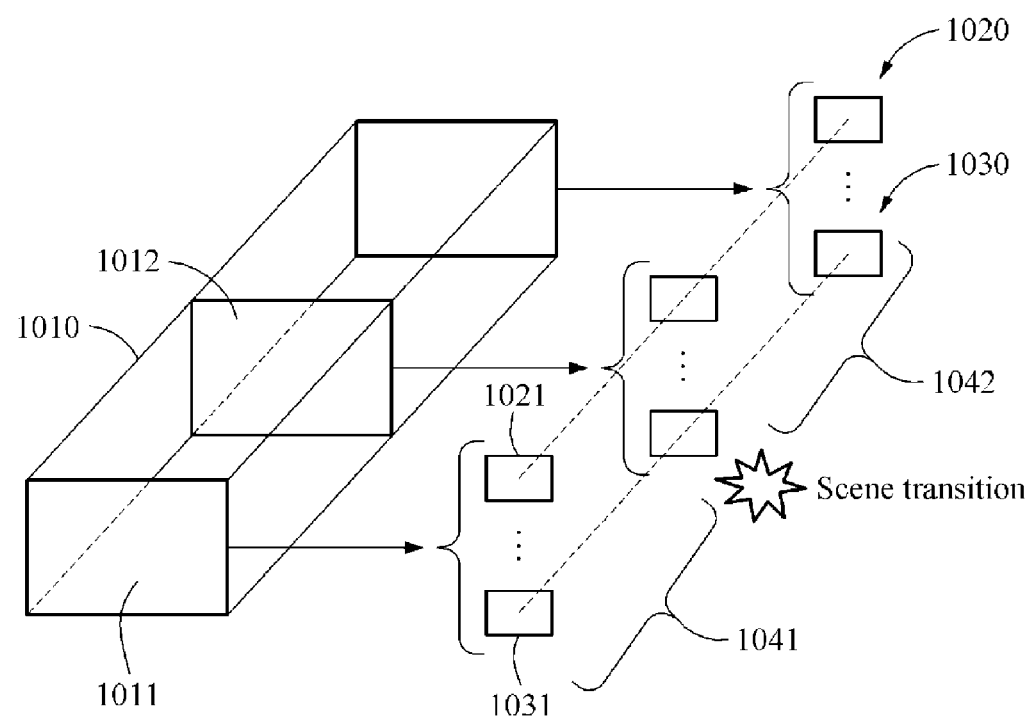
FIG. 10 illustrates a scheme of preventing an occurrence of flickering in a moving image according to at least some example embodiments.

FIG. 10 illustrates a scheme of preventing an occurrence of flickering in a moving image according to at least some example embodiments. Referring to FIG. 10, an image processing apparatus (e.g., the image processing apparatus 110) may generate M-viewpoint moving images 1020 and 1030 based on an N-viewpoint reference moving image 1010. In this example, N denotes a positive integer and M denotes an integer greater than N. The image processing apparatus may generate multiview images for each frame of the N-viewpoint reference moving image 1010 by applying, to the each frame, the above examples described with reference to FIGS. 1 through 9. The image processing apparatus may generate the M-viewpoint moving images 1020 and 1030 by connecting each frame of the multiview images to one another.

Despite an absence of a scene transition between frames, a similar form distribution feature generated for each of the frames in the N-viewpoint reference moving image 1010 may be changed slightly. When the similar form distribution feature is slightly changed between a frame and a neighboring frame of the frame, a slight difference may correspondingly occur in a hole-restored image of the neighboring image. In this example, a flickering may occur during a playback of a moving image.

The image processing apparatus may apply the same similar form distribution feature for each scene by sensing the scene transition in the moving image. Through this, the image processing apparatus may prevent an occurrence of the flickering in the moving image. For example, the image processing apparatus may generate a first similar form distribution feature based on a first frame 1011 of the N-viewpoint reference moving image 1010. The image processing apparatus may generate multiview images 1021 and 1031 corresponding to the first frame 1011 based on the first similar form distribution feature. The image processing apparatus may use the first similar form distribution feature during a time interval 1041 prior to an occurrence of the scene transition.

The image processing apparatus may sense the scene transition. The image processing apparatus may generate a second similar form distribution feature based on a first frame 1012 provided in response to the scene transition. The image processing apparatus may use the second similar form distribution feature during a time interval 1042 from an end point in time of the scene transition to a start point in time of a subsequent scene transition.

Although the above descriptions are provided based on the scene transition as an example, the present disclosure is not limited thereto. The image processing apparatus may determine a point in time of changing the similar form distribution feature based on various schemes. For example, the image processing apparatus may regenerate the similar form distribution feature at a desired or, alternatively, predetermined time interval.

Figure 11:
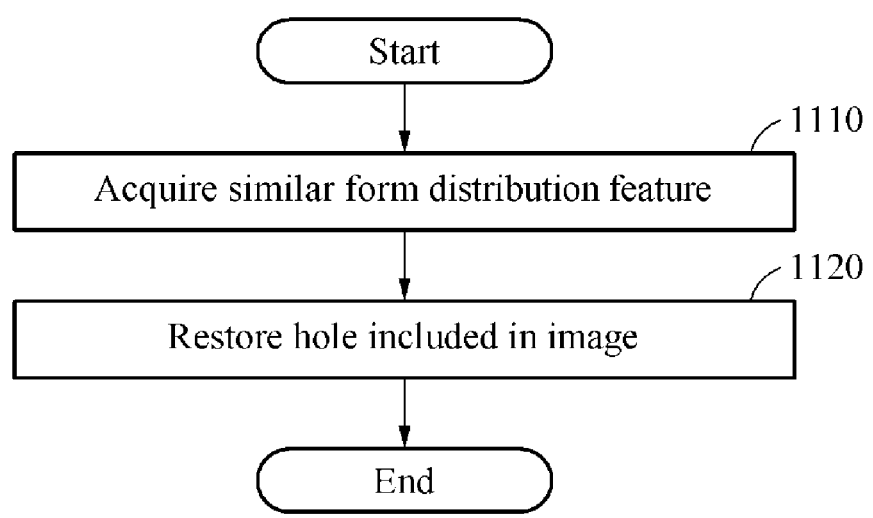
FIG. 11 illustrates an image processing method according to at least some example embodiments.

FIG. 11 illustrates an image processing method according to at least some example embodiments. Referring to FIG. 11, the image processing method includes operations 1110 and 1120. A similar form distribution feature is acquired in operation 1110, and a hole included in an image is restored based on the similar form distribution feature in operation 1120. Since the descriptions provided with reference to FIGS. 1 through 10 are also applicable here, repeated descriptions with respect to operations 1110 and 1120 of FIG. 11 will be omitted for increased clarity and conciseness.

Figure 12:
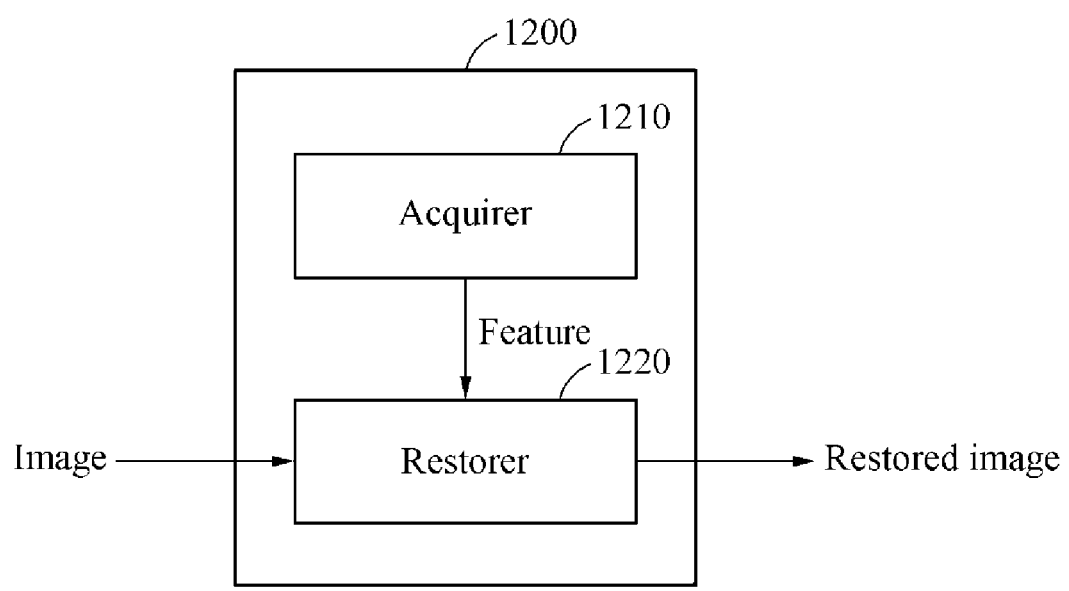
FIG. 12 illustrates an image processing apparatus according to at least some example embodiments.

FIG. 12 illustrates an image processing apparatus 1200 according to at least some example embodiments. Referring to FIG. 12, the image processing apparatus 1200 includes an acquirer 1210 and a restorer 1220. According to at least one example embodiment of the inventive concepts, like the image processing apparatus 110, the image processing apparatus 1200 may be implemented by, for example, hardware, processors executing computer-readable code, or a combination of the above-referenced hardware and processors executing computer-readable code configured to perform any or all of the operations described herein as being performed by the image processing apparatus 1200 (or an element thereof). For example, each of the acquirer 1210 and the restorer 1220 may be implemented as a software module, a hardware module, and a combination of the software module and the hardware module. The acquirer 1210 acquires a similar form distribution feature. The restorer 1220 restores a hole included in an image based on the similar form distribution feature. According to at least some example embodiments, the image processing apparatus 1200 may be an example of the image processing apparatus 110 of FIG. 1. Since the descriptions provided with reference to FIGS. 1 through 10 are also applicable here, repeated descriptions with respect to the acquirer 1210 and the restorer 1220 of FIG. 12 will be omitted for increased clarity and conciseness.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

Methods according to at least some of the above-described example embodiments may be recorded in non-transitory computer-readable media, for example in the form of program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image processing method comprising:
    acquiring a feature defining a distribution of similar forms in a first image; and
    restoring a hole included in a second image based on the feature.

2. The method of claim 1, wherein the feature comprises structure information on a background included in the first image.

3. The method of claim 1, wherein the restoring comprises:
    determining, based on the feature, candidate blocks corresponding to a restoration block, the restoration block including at least a portion of the hole; and
    restoring the restoration block based on the candidate blocks.

4. The method of claim 3,
    wherein the restoration block is located at a boundary of the hole, and
    wherein the restoring of the restoration block comprises:
        selecting at least one first candidate block from among the candidate blocks based on image information included in a portion of the restoration block; and
        restoring a hole included in a remaining portion of the restoration block based on the at least one first candidate block.

5. The method of claim 1, wherein the acquiring comprises:
    dividing the first image into a plurality of blocks;
    comparing a first block to other blocks in the plurality of blocks and detecting a second block having a similar form to the first block from among the other blocks;
    accumulating a frequency value of a relative position between the first block and the second block; and
    generating the feature based on the accumulated frequency value.

6. The method of claim 1, wherein the acquiring comprises:
    dividing the first image into a plurality of blocks;
    detecting a structure direction of a background included in the first image;
    comparing a first block to other blocks positioned in the structure direction relative to the first block in the plurality of blocks, and detecting a second block having a similar form to the first block from among the other blocks;
    accumulating a frequency value of a relative position between the first block and the second block; and
    generating the feature based on the accumulated frequency value.

7. The method of claim 6, wherein the detecting of the structure direction comprises:
    detecting edges included in the first image;
    determining a main direction based on gradients of the detected edges; and
    determining the main direction to be the structure direction.

8. The method of claim 1, wherein the acquiring comprises:
    dividing the first image into a plurality of layers based on depth information of the first image; and
    detecting, for each of the plurality of layers, a layer feature defining a distribution of similar forms in the layer.

9. The method of claim 8, wherein the restoring of the hole comprises:
    verifying a layer including a region adjacent to the hole;
    determining, based on a layer feature of the verified layer, at least one candidate block corresponding to a restoration block including at least a portion of the hole; and
    restoring the restoration block based on the at least one candidate block.

10. The method of claim 1, wherein the acquiring comprises:
    determining a region corresponding to a position of the hole; and
    detecting a region feature defining a distribution of similar forms in the determined region.

11. The method of claim 10, wherein the restoring comprises:
    determining at least one candidate block corresponding to a restoration block based on the region feature of the region corresponding to the position of the hole, the restoration block including at least a portion of the hole; and
    restoring the restoration block based on the at least one candidate block.

12. The method of claim 1, further comprising:
    generating a reference viewpoint image generated based on an input image, and wherein the restoring comprises:
predicting holes in multiview images to be generated based on the reference viewpoint image; and
restoring the predicted holes based on the feature.

13. The method of claim 12, further comprising:
distributing restoration information on the holes into the multiview images.

14. The method of claim 1, further comprising:
determining whether a scene transition is performed in the first image,
wherein the acquiring includes detecting the feature defining a distribution of similar forms in the first image, in response to a determination that the scene transition is performed.

15. The method of claim 14, wherein the acquiring comprises:
verifying the feature defining a distribution of similar forms in the first image, based on a feature detected from a previous frame in response to a determination that the scene transition is not performed.

16. The method of claim 1,
wherein the acquiring comprises:
receiving a feature generated based on a reference image, and
wherein the second image is generated by converting the reference image.

17. The method of claim 16, wherein the second image is generated by projecting pixels of the reference image onto a position corresponding to a viewpoint of the second image based on depth information of the reference image such that,
a moving distance for each of the pixels in the second image increases according to a decrease in a depth value of a corresponding pixel, and
the moving distance decreases according to an increase in the depth value of the corresponding pixel.

18. The method of claim 16, wherein the second image is generated by removing at least one object included in the reference image.

19. The method of claim 1, wherein the first image is identical to the second image.

20. The method of claim 1, wherein the first image is different from the second image.

21. A non-transitory computer-readable medium comprising program code that, when executed by a processor, performs functions according to the method of claim 1.

22. An image processing method comprising:
dividing a first image into a plurality of blocks;
analyzing the plurality of blocks;
determining a portion of the blocks as a plurality of candidate blocks based on the analysis; and
restoring a hole included in a second image based on the plurality of candidate blocks.

23. The method of claim 22, wherein the first image is identical to the second image.

24. The method of claim 22, wherein the first image is different from the second image.

25. The method of claim 22, wherein the analyzing comprises:
analyzing the plurality of blocks and acquiring a feature defining a distribution of similar forms in the first image; and
determining the portion of the blocks as the plurality of candidate blocks based on the feature.

26. The method of claim 22, wherein the restoring comprises:
selecting at least one first candidate block from among the plurality of candidate blocks based on image information included in a portion of a restoration block disposed at a boundary of the hole; and
restoring a hole included in a remaining portion of the restoration block based on the at least one first candidate block.

27. The method of claim 22, wherein the dividing comprises:
dividing the first image into a plurality of layers based on depth information of the first image; and
dividing each of the layers into a plurality of blocks.

28. The method of claim 27, wherein the analyzing comprises:
analyzing blocks corresponding to each of the plurality of layers and detecting, for each of the layers, a layer feature defining a distribution of similar forms of the layer;
verifying a layer including an area adjacent to the hole; and
selecting the plurality of candidate blocks from the plurality of blocks included in each of the layers based on the verified layer feature.

29. The method of claim 22, wherein the dividing comprises:
determining an area corresponding to a location of the hole; and
dividing the determined area into a plurality of blocks.

30. The method of claim 29, wherein the analyzing comprises:
analyzing blocks included in the determined area and detecting an area feature defining a distribution of similar forms; and
selecting the plurality of candidate blocks from the blocks included in the determined area based on the area feature.

31. A method comprising:
receiving at least one image including a background and at least one foreground object, the at least one foreground object having a first position relative to the background;
detecting a pattern of visually similar regions in the at least one image;
generating a similar form distribution feature based on the detected pattern, the similar form distribution feature defining an array of areas of the at least one image;
generating at least one image view based on the at least one image such that,
the at least one foreground object in the at least one image view has a second position relative to the background that is different than the first position, and the at least one image view includes an image hole;
selecting a first area of the at least one image view based on the similar form distribution feature;
generating an output image by filling the image hole of the at least one image view based on the first area of the at least one image view.

32. The method of claim 31, wherein the generating the at least one image view includes generating the at least one image view such that the image hole corresponds to a difference between the first and second positions.

33. The method of claim 31, wherein the selecting comprises:
detecting an area of the at least one view that includes both a portion of the image hole and a portion of the background;

determining a plurality of candidate areas, the plurality of candidate areas being areas of the at least one view that correspond to the array of areas of the similar form distribution feature; and selecting one of the plurality of candidate areas as the first area.

34. The method of claim 33, wherein the selecting one of the plurality of candidate areas comprises:

performing a comparison based on visual features of the portion of the background and visual features of a plurality of candidate areas of the at least one view; and selecting one of the plurality of candidate areas as the first area based on the comparison.

35. The method of claim 34, wherein the selected candidate area is the area, from among the plurality of candidate area, having a highest degree of similarity with respect to the portion of the background.

36. The method of claim 31, wherein the filling the image hole of the at least one image view includes replacing the image hole with visual features of the first area.

37. The method of claim 31, further comprising:

dividing the at least one image view into a plurality of blocks, wherein the first area is a block from among the plurality of blocks, and the array of areas correspond, respectively, to an array of blocks from among the plurality of blocks.

* * * * *